United States Patent [19]
Kawabata et al.

[11] Patent Number: 6,025,691
[45] Date of Patent: Feb. 15, 2000

[54] SYNCHRONOUS MOTOR CONTROL SYSTEM AND METHOD OF CONTROLLING SYNCHRONOUS MOTOR

[75] Inventors: Yasutomo Kawabata, Aichi-ken; Yoshiaki Taga, deceased, late of Aichi-ken; by Shigeo Taga, heir; by Takiko Taga, heir, both of Tokorozawa; by Tomoyo Taga, heiress, Nagoya; Masatoshi Uchida, Toyota; Akihiko Kanamori, Okazaki; Yukio Inaguma, Nagoya; Toshinobu Arakawa, Aichi-ken, all of Japan

[73] Assignees: Toyota Jidosha Kabushiki Kaisha, Toyota; Kabushiki Kaisha Toyota Chuo Kenkyusho, Aichi-gun, both of Japan

[21] Appl. No.: 09/037,632

[22] Filed: Mar. 10, 1998

Related U.S. Application Data

[63] Continuation of application No. 08/648,763, May 16, 1996, and a continuation of application No. 08/654,897, May 29, 1996, abandoned.

[30] Foreign Application Priority Data

May 29, 1995 [JP] Japan ..................................... 7-155431
May 29, 1995 [JP] Japan ..................................... 7-155432

[51] Int. Cl.$^7$ ...................................................... H02P 1/46
[52] U.S. Cl. ......................... 318/700; 318/716; 318/705; 318/721; 318/722; 318/798; 318/815
[58] Field of Search .................................. 318/716, 700, 318/705, 721, 722, 798, 815

[56] References Cited

U.S. PATENT DOCUMENTS 4,240,020  12/1980  Okuyama et al. .
4,309,643   1/1982  Akamatsu .
4,629,958  12/1986  Kurakake et al. .

(List continued on next page.)

FOREIGN PATENT DOCUMENTS

| 0 261 540 | 3/1988 | European Pat. Off. . |
| 0 261 549 | 3/1988 | European Pat. Off. . |
| 0 531 151 | 3/1993 | European Pat. Off. . |
| 59-198894 | 11/1984 | Japan . |
| 61-104776 | 7/1986 | Japan . |
| 62-88463 | 6/1987 | Japan . |
| 2-202329 | 8/1990 | Japan . |
| 2 114 781 | 8/1983 | United Kingdom . |

OTHER PUBLICATIONS

Patent Abstracts of Japan, vol. 12, No. 244 (E–631), Jul. 9, 1988, JP–A–63–031493, Feb. 10, 1988.

Patent Abstracts of Japan, vol. 18, No. 397 (E–1583), Jul. 26, 1994, JP–A–06–113583, Apr. 22, 1994.

Elektronik, vol. 38, No. 7, pp. 116–118, Mar. 31, 1989, Dipl.–Ing. Claus Uhrig, "Trapez–Oder Sinusansteuerung".

*Primary Examiner*—Karen Masih
*Attorney, Agent, or Firm*—Oblon, Spivak, McClelland, Maier & Neustadt, P.C.

[57] ABSTRACT

A synchronous motor control system which can freely regulate n-phase electric currents in a synchronous motor to control the characteristics of the synchronous motor. The synchronous motor control system can enhance the output torque per unit weight of a synchronous motor (40) simultaneously with reducing torque ripples. The waveform of three phase alternating currents is freely corrected over a range of +30 degrees from a specified electrical angle, at which a target phase current drawing a sine-wave curve reaches its peak value. It is assumed that this range of ±30 degrees corresponds to a range of 0 degree to 60 degrees. By way of example, the waveform is controlled to the peak value of the phase current in a range of 0 degree to 28 degrees. The correction of the phase current is carried out for the target phase which produces the primary magnetic flux of a revolving magnetic field. This improves a fall in torque due to the phase shift and reduces torque ripples while keeping the mean torque at a high level. The system of the invention can arbitrarily regulate the torque waveform of the synchronous motor (40), thereby freely controlling the torque characteristics of the synchronous motor (40).

19 Claims, 13 Drawing Sheets

U.S. PATENT DOCUMENTS

| | | |
|---|---|---|
| 4,833,588 | 5/1989 | Schauder . |
| 5,227,963 | 7/1993 | Schauder . |
| 5,387,854 | 2/1995 | McCleer et al. . |
| 5,436,544 | 7/1995 | Matsubara et al. . |
| 5,449,986 | 9/1995 | Dozor . |
| 5,504,404 | 4/1996 | Tamaki et al. ............................ 318/432 |
| 5,608,300 | 3/1997 | Kawabata et al. . |
| 5,635,810 | 6/1997 | Goel . |

6,025,691

SYNCHRONOUS MOTOR CONTROL SYSTEM AND METHOD OF CONTROLLING SYNCHRONOUS MOTOR

CROSS-REFERENCE TO RELATED APPLICATIONS

The present application is a continuation of US patent application Ser. No. 08/648,763 filed May 16, 1996 claiming benefit of priority under 35 USC §119 of Japanese application 7-155431 filed May 29, 1995, and US patent application Ser. No. 08/654,897 filed May 29, 1996 now abandonded claiming benefit of priority under 35 USC § 119 of Japanese application 7-155432(P) filed May 29, 1995 now abandonded, each of which, including each Japanese priority application, is incorporated herein by reference in its entirety.

BACKGROUND OF THE INVENTION

1. Field of the Invention

The present invention relates to a synchronous motor control system for controlling a synchronous motor driven by a power source of n-phase alternating currents, which draw sine waves as their basic waveform, and also to a method of controlling such a synchronous motor. More specifically the present invention pertains to a synchronous motor control system for arbitrarily controlling the characteristics of such a synchronous motor as well as to a method of controlling the same.

The present invention also relates to a synchronous motor control system for controlling each phase current of a synchronous motor, which drives and rotates a rotor by an interaction of a magnetic field produced by field coils through which a sine-wave multi-phase alternating current flows, with a magnetic field produced by permanent magnets mounted on the rotor, and also to a method of controlling such a synchronous motor. More specifically, the present invention pertains to a technique for improving mechanical outputs of such a synchronous motor.

2. Description of the Related Art

Synchronous motors giving stable rotating characteristics at a synchronizing speed have been utilized in a variety of fields. The advance of semiconductor technology enables the frequency of a power source to be easily varied and realizes a wide range of control for the revolving speed of the synchronous motor. This further expands the applicable field of the synchronous motors. The synchronous motors have recently been applied to the high-torque requirements, for example, as the power source of electric vehicles.

Known improvement in a conventional synchronous motor control system includes varying the revolving speed of the synchronous motor over a wide range and smoothing the rotation of the synchronous motor to a possible extent.

In synchronous motors using n-phase alternating currents as a power source, the phase of producing the primary magnetic flux is shifted at every 180/n degrees of electrical angle. This undesirably causes torque ripples. A variety of techniques have been proposed in order to reduce the fluctuated rotation due to the torque ripples. By way of example, a proposed control system decreases the phase current at an electrical angle corresponding to a maximum momentary torque and reduces the maximum torque in the cycle of torque ripples, thereby reducing the torque ripples. The proposed techniques also include lowering the general torque command value, making parts of the armature windings of the adjacent phases to be overlapped with each another to depress the variation in magnetic flux accompanied with the phase shift, and adjusting the gap length between the rotor and the stator. Another proposed structure obliquely cuts specific ends of permanent magnets along the rotational axis to reduce a fluctuation in torque.

These proposed techniques reduce torque ripples of a synchronous motor where lowering the mechanical output. In the technique of decreasing the input electric current in the range of electrical angles corresponding to greater torques for the purpose of reducing torque ripples, the decrease in input electrical energy lowers the mechanical outputs of the synchronous motor and thereby decreases the mean output torque. Another technique of making the windings dispersed in adjacent phases of the synchronous motor undesirably decreases the primary magnetic flux, which is dominant in generation of the torque of the synchronous motor. This lowers the maximum output torque per volume of the synchronous motor.

The lowered output accompanied with the reduction of torque ripples may cause problems in some fields to which the synchronous motor is applied. For example, in the case that the synchronous motor is used as a power source of electric vehicles, the decrease in mechanical output per unit weight of the synchronous motor is undesirable. When the minimum torque is less than a predetermined level, the synchronous motor may be stepped out under the condition of large loading. The decrease in maximum mechanical output prevents the electric vehicle from running satisfactorily under the condition requiring large torques, for example, at the time of starting or ascending a slope.

Thus, these improvements attain some reduction of torque ripples, but do not control the output torque of the synchronous motor according to the rotational angle thereof.

The synchronous motor control system of the present invention is based on the novel conception, that is, to control the output torque of a synchronous motor according to the electrical angle thereof.

SUMMARY OF THE INVENTION

One object of the present invention is to increase a minimum torque observed at a specific electrical angle in a cycle of torque ripples, thereby eliminating torque ripples.

The above object is realized by a synchronous motor control system for controlling a synchronous motor, wherein multi-phase alternating currents flow through field coils of the synchronous motor and an internal rotor of the synchronous motor is driven to rotate by an interaction of a magnetic field produced by the multi-phase alternating currents with a magnetic field produced by permanent magnets mounted on the rotor.

The present invention is also directed to a method of controlling a synchronous motor, wherein multi-phase alternating currents flow through field coils of the synchronous motor and an internal rotor of the synchronous motor is driven to rotate by an interaction of a magnetic field produced by the multi-phase alternating currents with a magnetic field produced by permanent magnets mounted on the rotor.

In the method of the present invention a specified phase current to a peak value thereof or an equivalent value over a predetermined range around a specific electrical angle is modified, at which a momentary value of the predetermined phase current reaches the peak value. Phase currents other than the predetermined phase current which is subject to the correction to the peak or equivalent value are not dominant in generation of the torque. The other phase currents are thus increased or decreased to balance the sum of all the phase currents. The technique of the present invention continuously keeps the absolute value of the target phase current, which is dominant in generation of torque, at its peak or equivalent value, thereby increasing the mechanical output and raising the minimum torque.

This structure effectively reduces torque ripples without decreasing the output of the synchronous motor. The system of the present invention does not waste the electric power and thus increases the mechanical output per unit weight of the synchronous motor.

A further object of the present invention is thus to provide a synchronous motor control system which can improve the mechanical output per unit weight of a synchronous motor simultaneously with elimination of torque ripples.

In order to realize the above object, the present invention is directed to a synchronous motor control system for supplying n-phase alternating currents, each current drawing a sine wave as its basic waveform, to respective phase coils of a synchronous motor to activate and rotate the synchronous motor. The synchronous motor control system of the present invention measures an electrical angle of each phase current of the n-phase alternating currents, which produce a revolving magnetic field in the synchronous motor and executes correction of a predetermined phase current over a range of ±180/2n degrees from a specified electrical angle, at which the sine-wave curve of the predetermined phase current reaches its peak value, based on the measured electrical angle. The peak value of the sine-wave curve is defined as the limit of correction. Simultaneously with the phase correction, phase current, other than the predetermined phase current which is subject to correction are corrected, thereby balancing the sum of all the phase currents.

Another object of the present invention is to carry out the phase current correction discussed above only when a specific condition is fulfilled. The phase current correction is implemented when a certain driving parameter (for example, revolving speed) of the synchronous motor satisfies a predetermined condition. The synchronous motor control system can accordingly implement the phase current correction only under specific driving conditions which are significantly affected by the torque control based on the electrical angle.

In accordance with one aspect, the synchronous motor control system of the present invention is mounted on a vehicle and works to drive a synchronous motor, which is mounted on the vehicle as a power source.

Still another object of the present invention is to provide a method of controlling a synchronous motor in order to improve the mechanical output per unit weight of the synchronous motor simultaneously with reducing torque ripples.

In order to realize the above object, the present invention is directed to a method of controlling a synchronous motor by supplying n-phase alternating currents, each current drawing a sine wave as its basic waveform, to respective phase coils of the synchronous motor to activate and rotate the synchronous motor. In the method of the invention the electrical angle of each phase current among n-phase alternating currents, which produce a revolving magnetic field in the synchronous motor is measured. Each phase current is either increased or decreased according to the data of electrical angle, using the peak value of the sine-wave curve set as the limit of correction. This technique enables the waveform of output torque of the synchronous motor to be arbitrarily controlled by appropriately setting a correction value of each phase current.

The requirement for phase current correction is determined according to the operating conditions of the synchronous motor. This technique realizes torque characteristics suitable for the operating conditions of the synchronous motor.

These and other objects, features, aspects, and advantages of the present invention will become more apparent from the following detailed description of the preferred embodiments with the accompanying drawings.

DESCRIPTION OF THE PREFERRED EMBODIMENT

Figure 2:
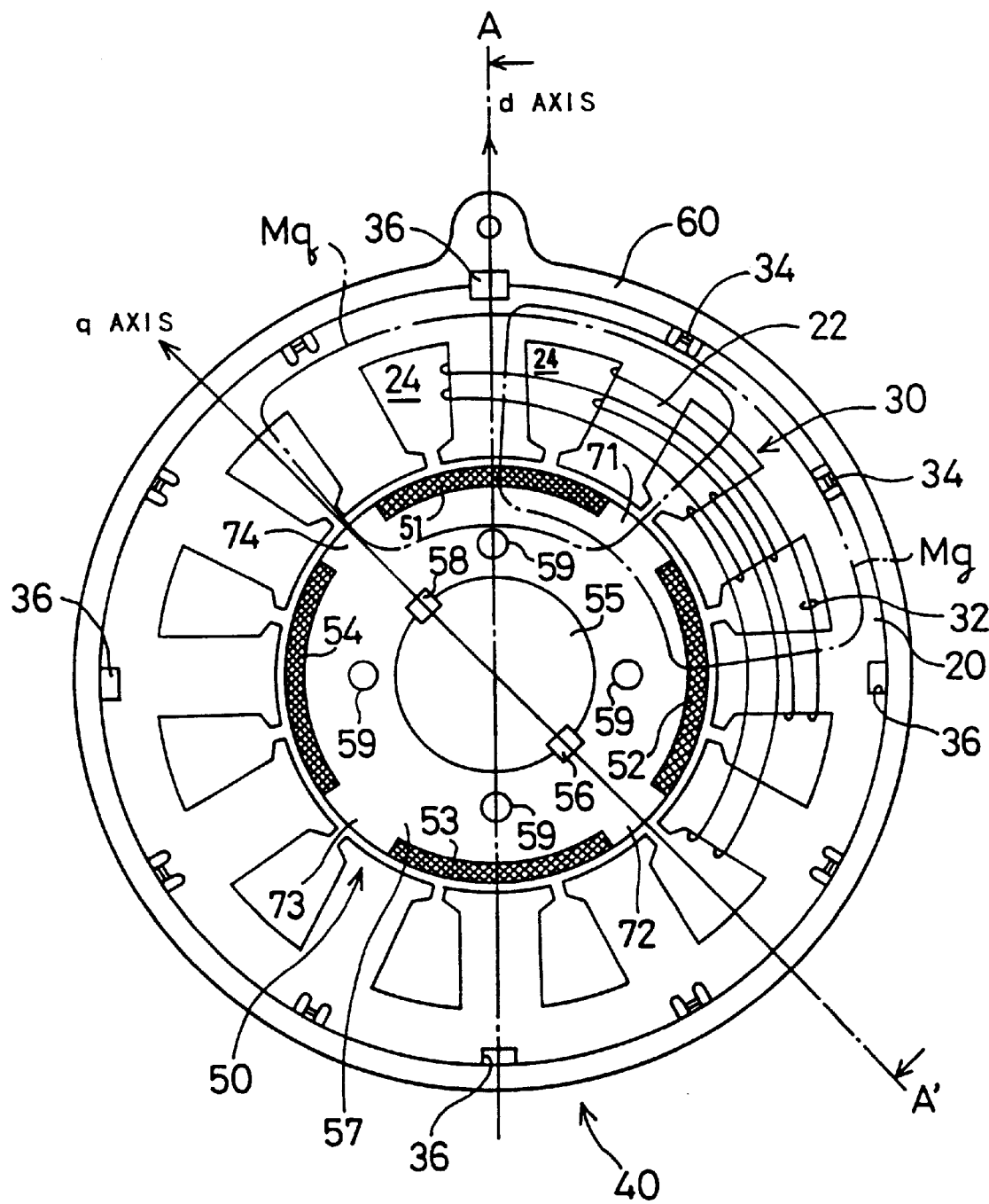
FIG. 2 is a cross sectional view illustrating structure of the synchronous motor 40.
Figure 3:
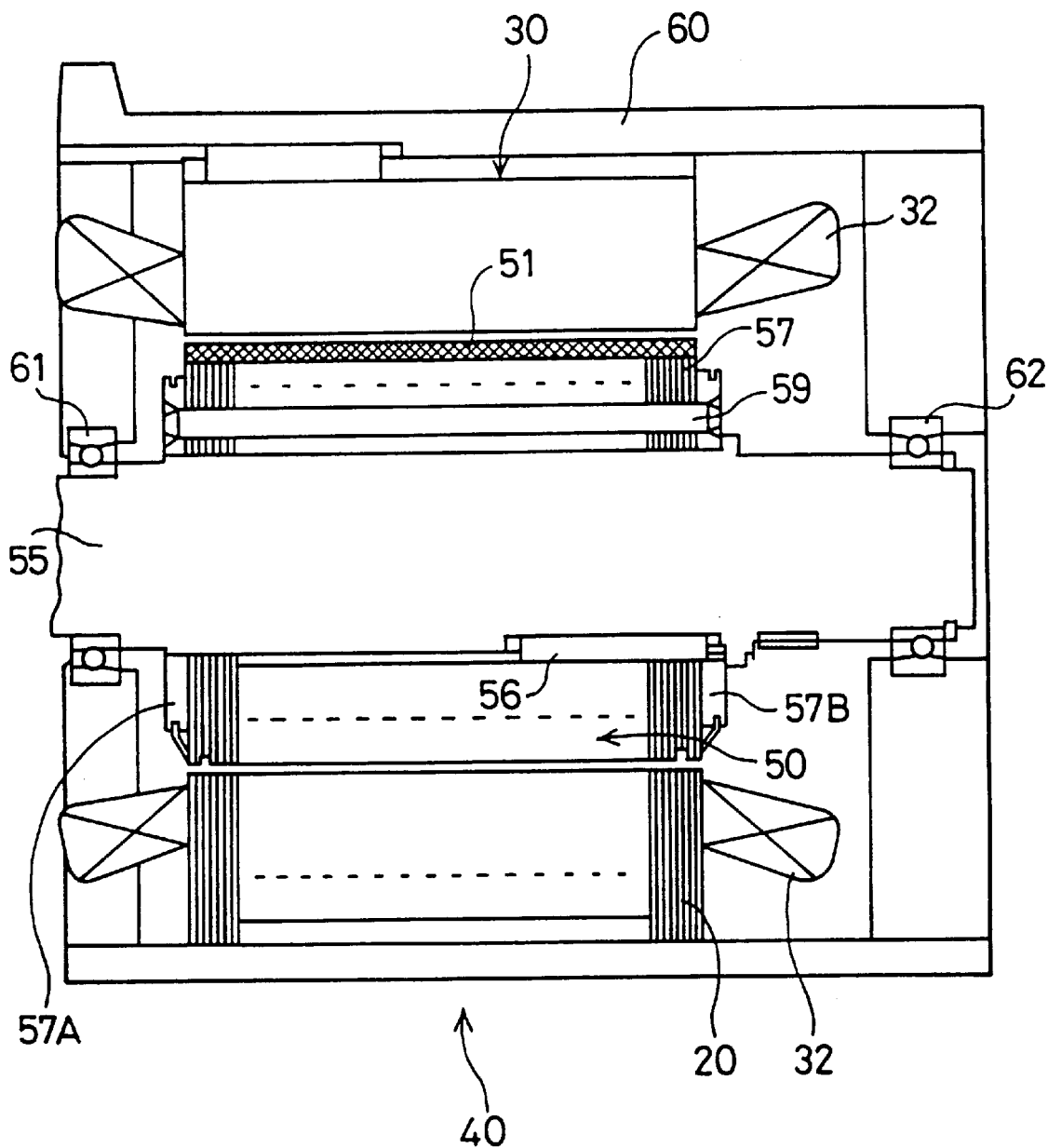
FIG. 3 is a cross sectional view illustrating structure of the synchronous motor 40, taken on the lines A—A' of FIG. 2.

As a matter of convenience, general structure of the synchronous motor 40 is described first with reference to the drawings of FIGS. 2 and 3. The synchronous motor 40 includes a stator 30, a rotor 50, and a casing 60 for accommodating the stator 30 and the rotor 50 therein. The rotor 50 has permanent magnets 51 through 54 attached to the circumference thereof and a rotating shaft 55 arranged on the axial center thereof. The rotating shaft 55 is rotatably supported by a pair of bearings 61 and 62 mounted on the casing 60.

The rotor 50 includes a plurality of rotor elements 57 punched from a non-directional electromagnetic steel plate and laid one upon another as shown in FIG. 3. Each rotor element 57 has four salient poles 71 through 74 arranged at 90-degree intervals as shown in FIG. 2. The salient poles 71 through 74 may be formed integrally with the rotor element 57 or otherwise formed separately and afterwards attached to the rotor element 57. Each rotor element 57 is further provided with four through holes, into which assembling pins 59 are inserted and fitted. After the plurality of rotor elements 57 are positioned by the pins 59 and laid one upon another, end plates 57A and 57B are arranged before and after the laminate of rotor elements 57. The respective ends of the pins S9 are caulked or welded to the end plates 57A and 57B, so that the laminate of rotor elements 57 is fixed. The laminate of rotor elements 57 forms a hollow center for receiving the rotating shaft 55 pressed therein. The rotor elements 57 also have key grooves 58 for the purpose of fixture. The rotating shaft 55 with keys 56 received by key grooves formed in the rotating shaft 55 is inserted into the hollow center defined by the laminate of rotor elements 57. This completes the assembly of the rotor 50.

After the assembly of the rotor 50, the four permanent magnets 51 through 54 of a predetermined thickness are attached along the axis of the rotor 50 on the circumference of the rotor 50. The permanent magnets 51 through 54 are magnetized in the direction of thickness. When the rotor 50 is coupled with the stator 30, a magnetic path Mg is formed to pass through the adjacent permanent magnets, the rotor elements 57, and stator elements 20 (see FIG. 2).

Like the rotor elements 57, the stator elements 20 constituting the stator 30 are punched from a non-directional electromagnetic steel plate. Each stator element 20 includes a total of twelve teeth 22 as shown in FIG. 2. Each stator element 20 has, on its circumference, eight notches 34 used for welding and four key grooves 36 for receiving fixture keys. The stator 30 is assembled by positioning a laminate of plate-like stator elements 20 with a jig and welding the notches 34 formed on the circumference of the respective stator elements 20. Coils 32 for generating a revolving magnetic field in the stator 30 are wound on slots 24 formed between adjacent teeth 22.

The stator 30 thus assembled is coupled with the casing 60 by inserting fixture keys into key grooves formed on the inner surface of the casing 60 and the corresponding key grooves 36 formed on the circumference of the stator 30. The rotor 50 is then linked with the assembly of the stator 30 and the casing 60 to be rotatably supported by the bearings 61 and 62 of the casing 60. This completes the assembly of the synchronous motor 40.

When an exciting current is fed to the coils 32 on the stator 30 to generate a revolving magnetic field, a magnetic path Mq is formed to pass through the adjacent salient poles, the rotor elements 57, and the stator elements 20. In the description, an axis of the permanent magnet-based magnetic flux diametrically passing through the rotor 50 is referred to as 'd' axis, whereas that of the coil-based magnetic flux diametrically passing through the rotor 50 is referred to as 'q' axis. In this embodiment having the four poles, the d axis and the q axis are electrically arranged with the angle of 90 degrees. In other words, the q axis is in-phase with a non-load induction electromotive force E0 of the synchronous motor 40, whereas the d axis is vectrorially perpendicular to the non-load induction electromotive force E0. Each phase current I is decomposed to vectors of the d axis and the q axis. This enables the operation of the synchronous motor 40 to be easily monitored and controlled.

Figure 1:
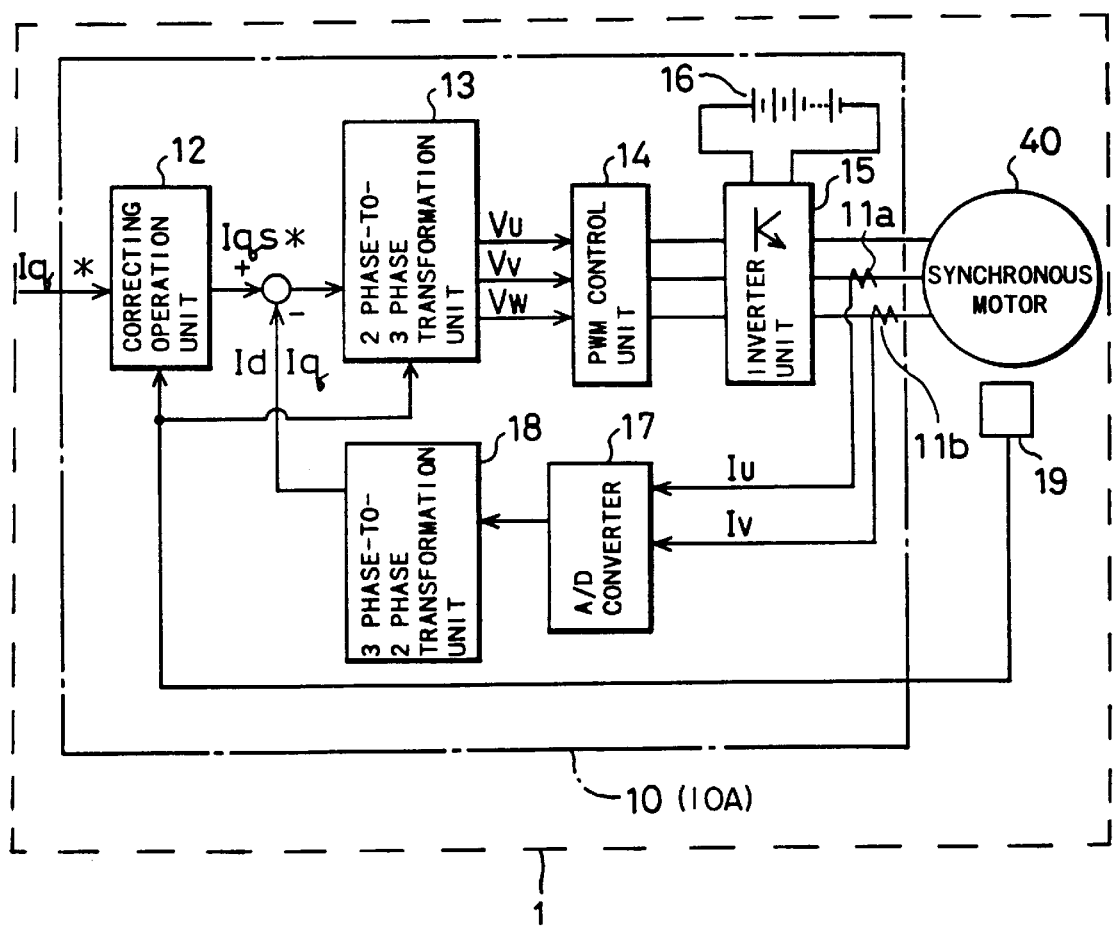
FIG. 1 is a general block diagram illustrating a synchronous motor control system 10 embodying the present invention with a synchronous motor 40 controlled thereby.

Referring to the block diagram of FIG. 1, the synchronous motor control system 10 of the embodiment includes a correcting operation unit 12, a 2 phase-to-3 phase transformation unit 13, a PWM (pulse width modulation) control unit 14, an inverter unit 15, an analog-to-digital (A/D) converter 17, and a 3 phase-to-2 phase transformation unit 18. The correcting operation unit 12 corrects an externally given electric current command value I* based on the loading condition of the synchronous motor 40 and thereby corrects a target phase current I of the synchronous motor 40. A difference between an output Is* from the correcting operation unit 12 and an output from the 3 phase-to-2 phase transformation unit 18 is calculated and used as feedback data for the subsequent control. These operations are carried out for values of electric currents Id and Iq of the d axis and the q axis.

The 2 phase-to-3 phase transformation unit 13 is a circuit for transforming the values of electric currents Id and Iq to actual phase currents (three-phase currents). The 2 phase-to-3 phase transformation unit 13 also transforms the three phase currents to signals of target voltages Vu, Vv, and Vw applied to the respective phases. The PAM control unit 14 converts the target voltages Vu, Vv, and Vw of the three phases thus obtained to the duty ratio of square waves, in order to realize the target voltages Vu, Vv, and Vw through the on-off control of a direct current power source (not shown). The inverted unit 15 controls internal six switching elements based on the on-off signals sent from the PWM control unit 14, and thereby applies voltages from a direct current power source 16 to the three-phase coils of the synchronous motor 40. The inverter unit 15 is further provided with electric current sensors 11a and 11b for measuring an U-phase current In and a V-phase current Iv, respectively. The respective phase currents In and Iv measured with the electric current sensors 11a and 11b are converted to digital data by the A/D converter 17 and used for the subsequent control as described below. An electrical angle θ required for the control of the synchronous motor 40 is measured with a rotational angle sensor 19 attached to the synchronous motor 40. The rotational angle sensor 19 used here has a known structure utilizing Hall elements.

Figure 4:
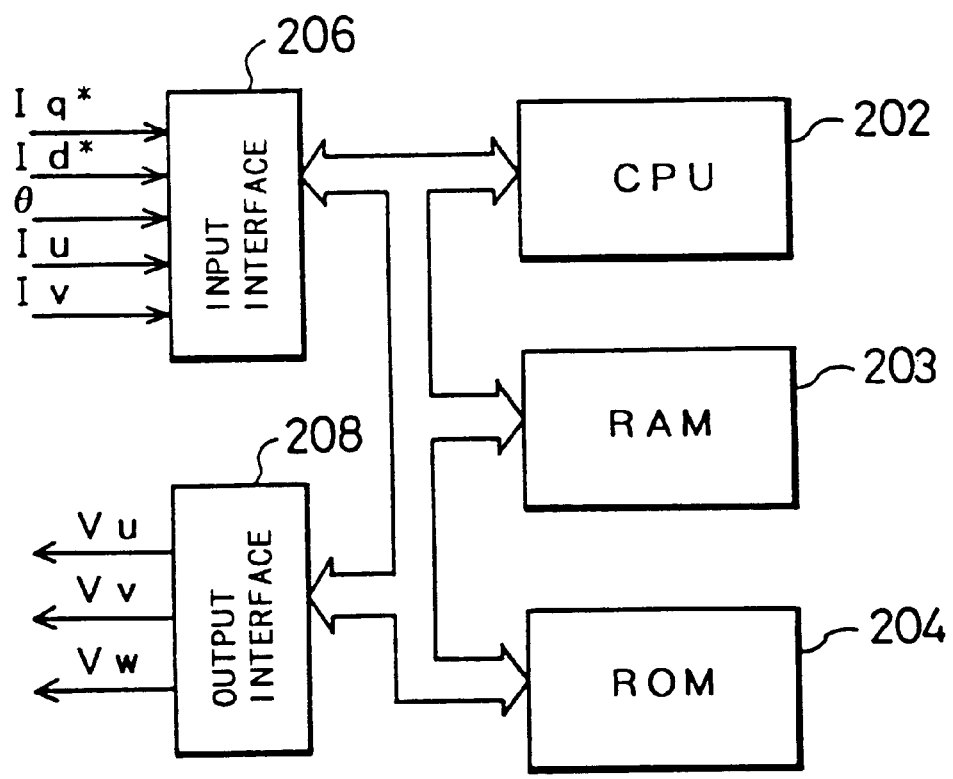
FIG. 4 is a block diagram showing a logic circuit of the synchronous motor control system 10.

In the synchronous motor control system 10 of the embodiment, the correcting operation unit 12, the 2 phase-to-3 phase transformation unit 13, and the 3 phase-to-2 phase transformation unit 18 are actually constructed as a logic circuit. Referring to the block diagram of FIG. 4, the logic circuit includes a CPU 202, a RAM 203 working as a main memory of the CPU 202, a ROM 204 in which programs (described later) are stored in a non-volatile manner, an input interface 206, and an output interface 208. The CPU 202 executes a routine of electric current control (shown in the flowchart of FIG. 5) stored in the ROM 204 and determines the target voltages Vu, Vv, and Vw of the three phases to be output to the PWM control unit 14. The functions of the respective elements shown in the block diagram of FIG. 1 are realized by executing this process.

Figure 5:
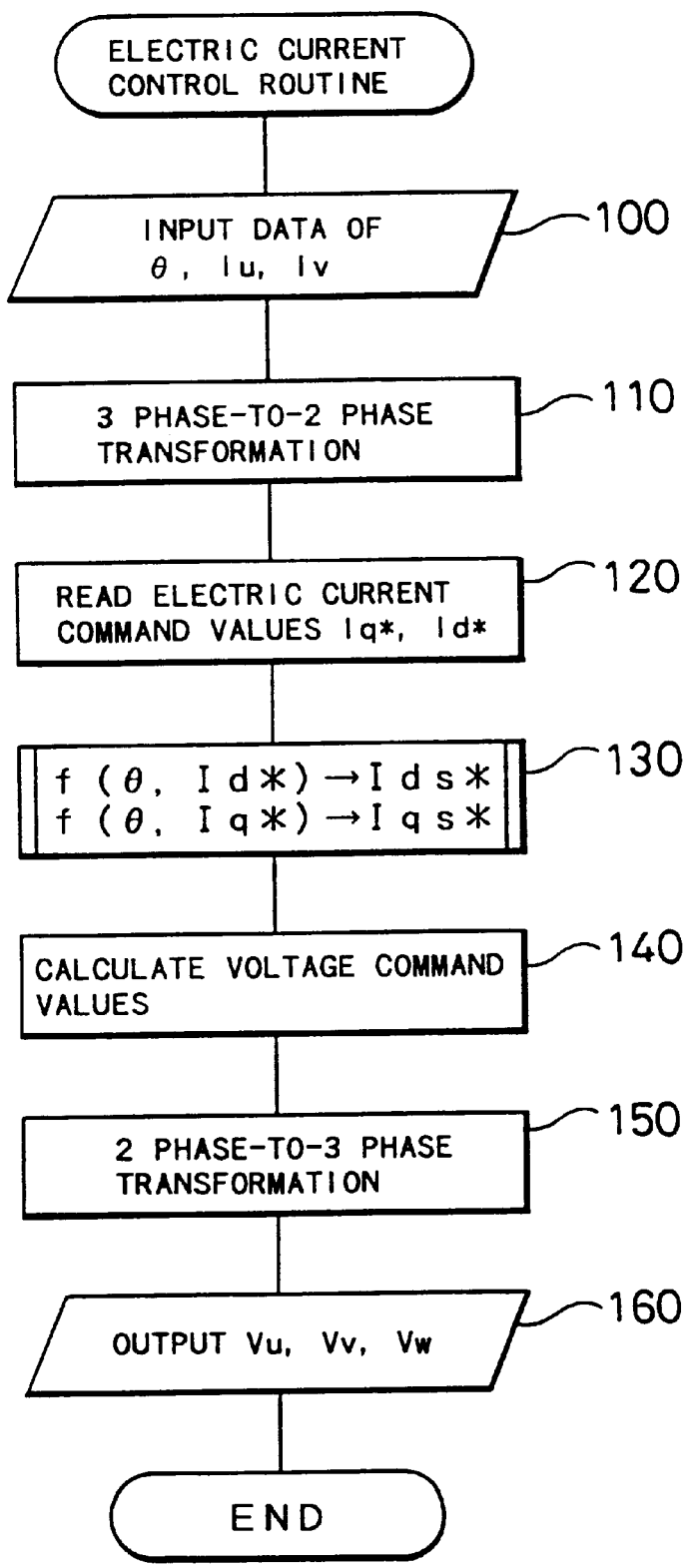
FIG. 5 is a flowchart showing an electric current control routine executed by the logic circuit of FIG. 4.

When the program enters the electric current control routine of FIG. 5, the CPU 202 first receives data of phase currents Iu and Iv and electrical angle θ via the input interface 206 at step S100, and transforms the data of phase currents Iu and Iv and electrical angle θ to electric currents Id and Iq in the d-q coordinate system at step S110. This 3 phase to 2 phase transformation for giving the electric currents of d and q axes is implemented according to the operation expressed as Equation (1) given below. This process corresponds to the 3 phase-to-2 phase transformation unit 18 in the block diagram of FIG. 1.

$$\begin{bmatrix} Id \\ Iq \end{bmatrix} = \sqrt{2} \begin{bmatrix} -\sin(\theta - 120) & \sin\theta \\ -\cos(\theta - 120) & \cos\theta \end{bmatrix} \begin{bmatrix} Iu \\ Iv \end{bmatrix} \quad (1)$$

Figure 6:
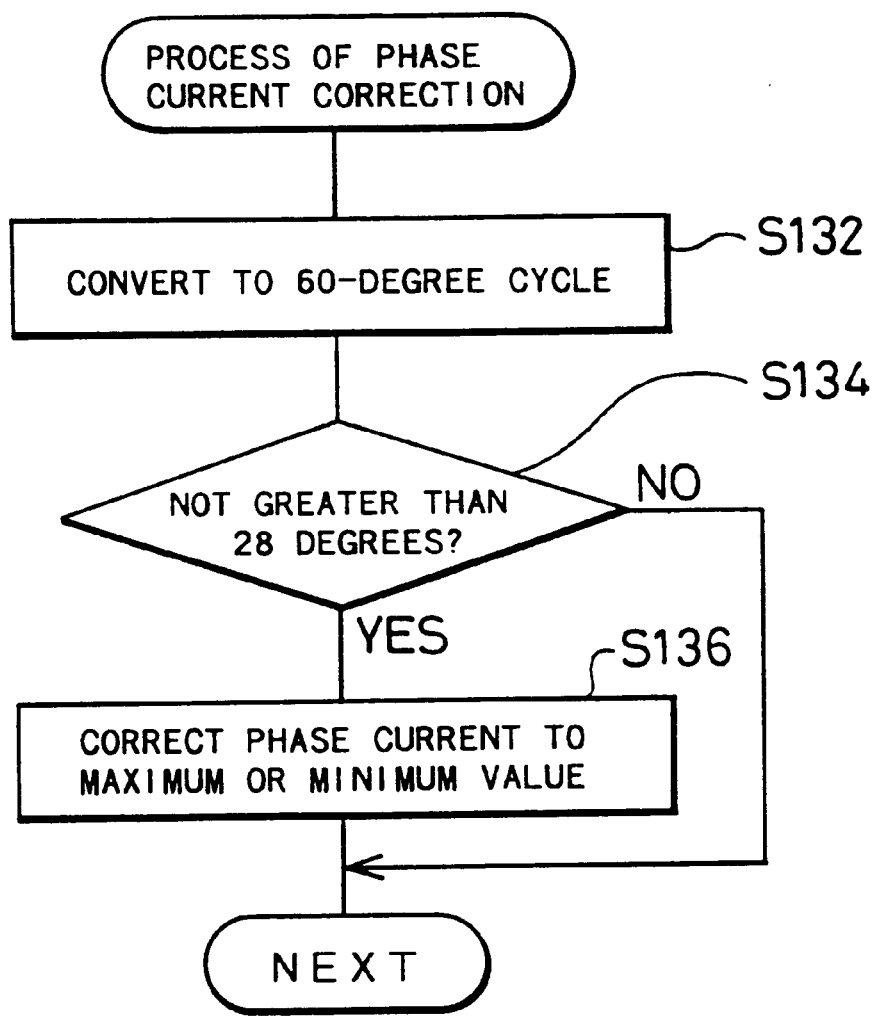
FIG. 6 is a flowchart showing details of phase current correction executed at step S130 in the flowchart of FIG. 5.
Figure 7:
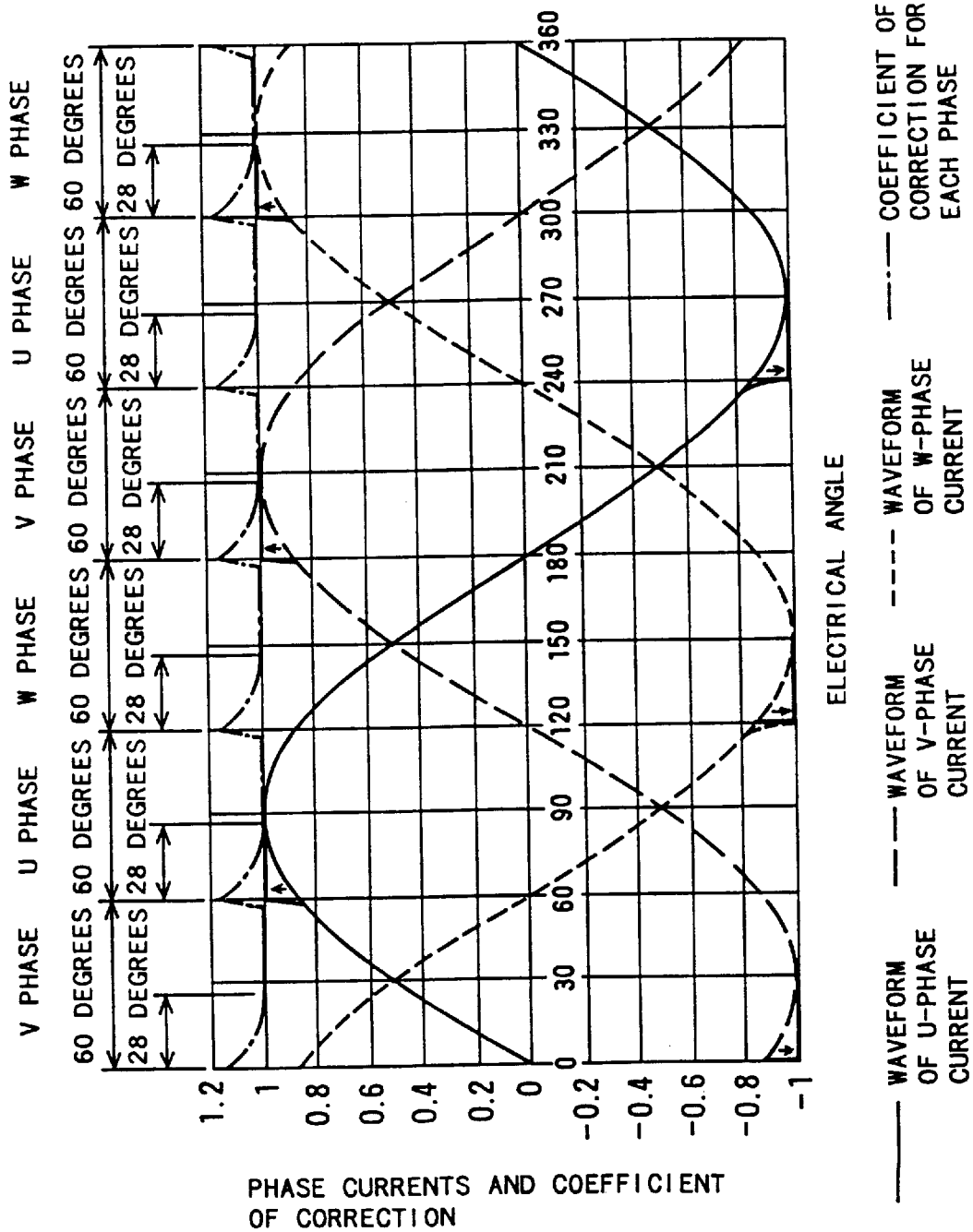
FIG. 7 is a graph showing variations in three phase alternating currents and coefficient of correction plotted against the electrical angle in the phase current correction process.

At subsequent step S120, the CPU 202 reads electric current command values (target electric currents) Iq* and Id*, which are previously determined according to the required torques and given to the synchronous motor control system 10. An operation of phase current correction is then executed to correct the target electric currents Iq* and Id* at step S130. The operation of phase current correction multiplies the electric current command values Iq* and Id* by a coefficient of correction mapped to the electrical angle θ to yield corrected target electric currents Iqs* and Ids*. In order to attain target outputs, the target electric currents are multiplied by the coefficient of correction. The curve shown of the one-dot chain line in the upper-most portion of FIG. 7 shows a variation in coefficient of correction used for the processing of step S130. The flowchart of FIG. 6(b) shows the detailed operation of phase current correction executed at step S130 in the flowchart of FIG. 5.

When the program starts the operation of phase current correction, the CPU 202 first transforms the electrical angle θ to a value of the 60-degree cycle at step S132. The process of step S132 gives transformed data φ according to the equation of:

$$\phi = \theta - 60 \cdot m$$

wherein m denotes a positive integer and 0≦φ<60. Referring to the graph of FIG. 7, the phase of producing the primary magnetic flux of the revolving magnetic field generated by the three phase alternating currents is shifted at every electrical angle of 60 degrees, and the phase shift causes torque ripples. This is the reason why the transformation to the value of the 60-degree cycle is required. In this embodiment, the identical control process is repeatedly executed in the cycle of 60 degrees. This minimizes the required capacity of a correction table, in which coefficients of correction are mapped to electrical angles.

The program proceeds to step S134, at which it is determined whether the transformed data φ is equal to or less than 28 degrees. When the transformed data φ is greater than 28 degrees, the program does not carry out any correction of phase currents but goes to NEXT to exit from the routine of FIG. 6. When the transformed data φ is not greater than 28 degrees, on the other hand, the target phase current is corrected to its peak value at step S136. The following gives the reason why the correction is carried out for the transformed data φ of not greater than 28 degrees. Referring back to the graph of FIG. 7, torque ripples appear a decrease in torque especially when the transformed data is not greater than 28 degrees in the 60-degree cycle. The correction increases the torque in the range of not greater than 28 degrees. In the routine of FIG. 6, no correction is carried out for the transformed data φ of greater than 28 degrees. In accordance with an alternative structure, the target electric currents may be multiplied by the coefficient of correction equal to one.

After the correction of step S130, the program proceeds to step S140 in the flowchart of FIG. 5, at which the CPU 202 calculates voltage command values Vd and Vq based on the respective differences between the corrected target electric currents Ids* and Iqs* and actual data of d-axis and q-axis electric currents Id and Iq. The voltage command values Vd and Vq are used to enable desired electric currents to flow through the synchronous motor 40. At subsequent step S150, the voltage command values Vd and Vq are transformed to actual three phase voltages Vu, Vv, and Vw through the 2 phase to 3 phase transformation. The transformation executed at step S150 is in the reverse of the transformation carried out at step S110. The voltages Vu, Vv, and Vw of the three phases are determined according to Equation (2) given below. This process corresponds to the 2 phase-to-3 phase transformation unit 13.

$$\begin{bmatrix} u \\ v \end{bmatrix} = \sqrt{\frac{2}{3}} \begin{bmatrix} \cos\theta & -\sin\theta \\ \cos(\theta - 120) & -\sin(\theta - 120) \end{bmatrix} \begin{bmatrix} V \\ V \end{bmatrix} \quad (2)$$

$$Vw = -Vu - Vv$$

The results of 2 phase to 3 phase transformation are output to the PWM control unit 14 via the output interface 208 at step S160. The PAM control unit 14 receives the output signals, converts the magnitude of input voltages to the duty ratio of on-off signals, and outputs the duty ratio to the inverter unit 15. This process eventually controls each phase current of the synchronous motor 40 to a desired value and realizes the current control shown in FIG. 7.

Referring to FIG. 7, the process of electric current control or more specifically the process of phase current correction (step S130 in the flowchart of FIG. 5) executed in the d-q coordinate system is applied to the actual three phase alternating currents. The electric currents flowing through the three phases draw sine waves as their basic waveform. A momentary value of each phase current is either increased or decreased in each specific range of 28 degrees around a zero point, at which the transformed data φ is equal to 0 degree. Each zero point is 30 degrees prior to a specific electrical angle at which the target phase current drawing a sine-wave curve reaches its peak value. Each phase current in the specific range is accordingly increased or decreased to the peak value of the phase current. This is equivalent to the correction on the d and q axes executed at step S130. The curve of one-dot chain line in the upper-most portion of FIG. 7 shows a variation in coefficient of correction in the three-phase coordinate system. The coefficient-of-correction curve gives an identical value at every 60 degrees, which corresponds to one cycle of torque ripples. The coefficient-of-correction curve has the value of 1/(sin60), which is approximately equal to 1.15, for the transformed data φ equal to zero degree, then gradually decreases according to the curve of 1/{sin(60-φ)}, and gives the value of '1' for the transformed data φ of equal to or greater than 28 degrees. Each target phase current is enhanced in the former half of the ripple cycle (0≦φ<28).

Figure 8:
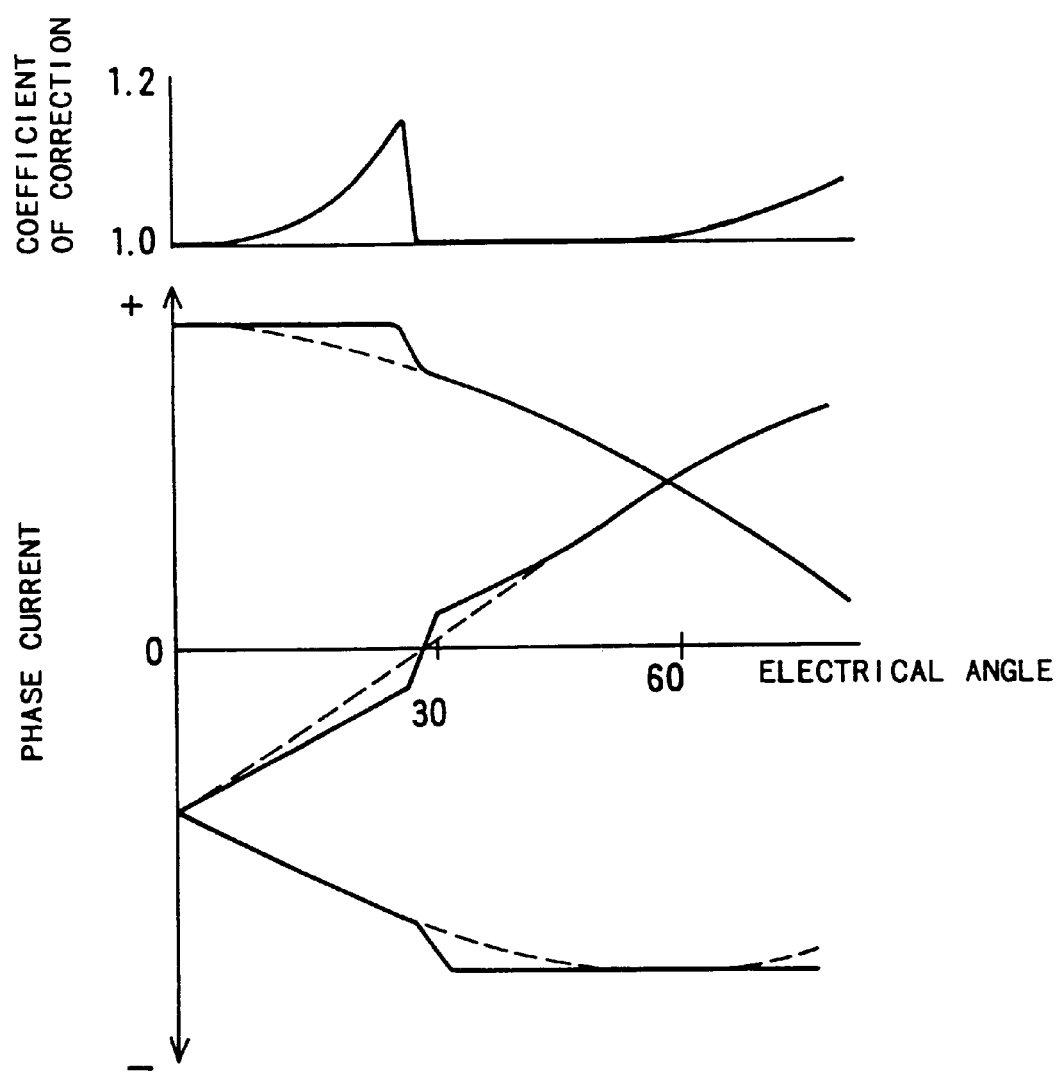
FIG. 8 is a graph showing correction of other phases in addition to the phase current correction.

The graph of FIG. 7 shows variations in three phase currents before and after the correction, in addition to the variation in coefficient of correction. Correction of the three phase currents with the coefficient of correction are shown by the solid arrows. In a revolving magnetic field, when the electric current producing the primary magnetic flux, which gives the greatest contribution to the torques, is shifted from a current phase to a next phase, the next phase current for producing the primary magnetic flux is corrected to its peak value as shown by the solid arrow in FIG. 7. As a matter of convenience of illustration, the coefficient-of-correction curve of FIG. 7 shows only a variation in coefficient of correction applied to the phase of producing the primary magnetic flux. The electric currents of the other two phases, which do not produce the primary magnetic flux, are corrected to maintain the balanced state of the three phase alternating currents. FIG. 8 shows the detailed procedure of such correction. Since the electric currents of the other two phases are corrected in this manner, the sum of the three phase alternating currents is kept zero.

Figure 9:
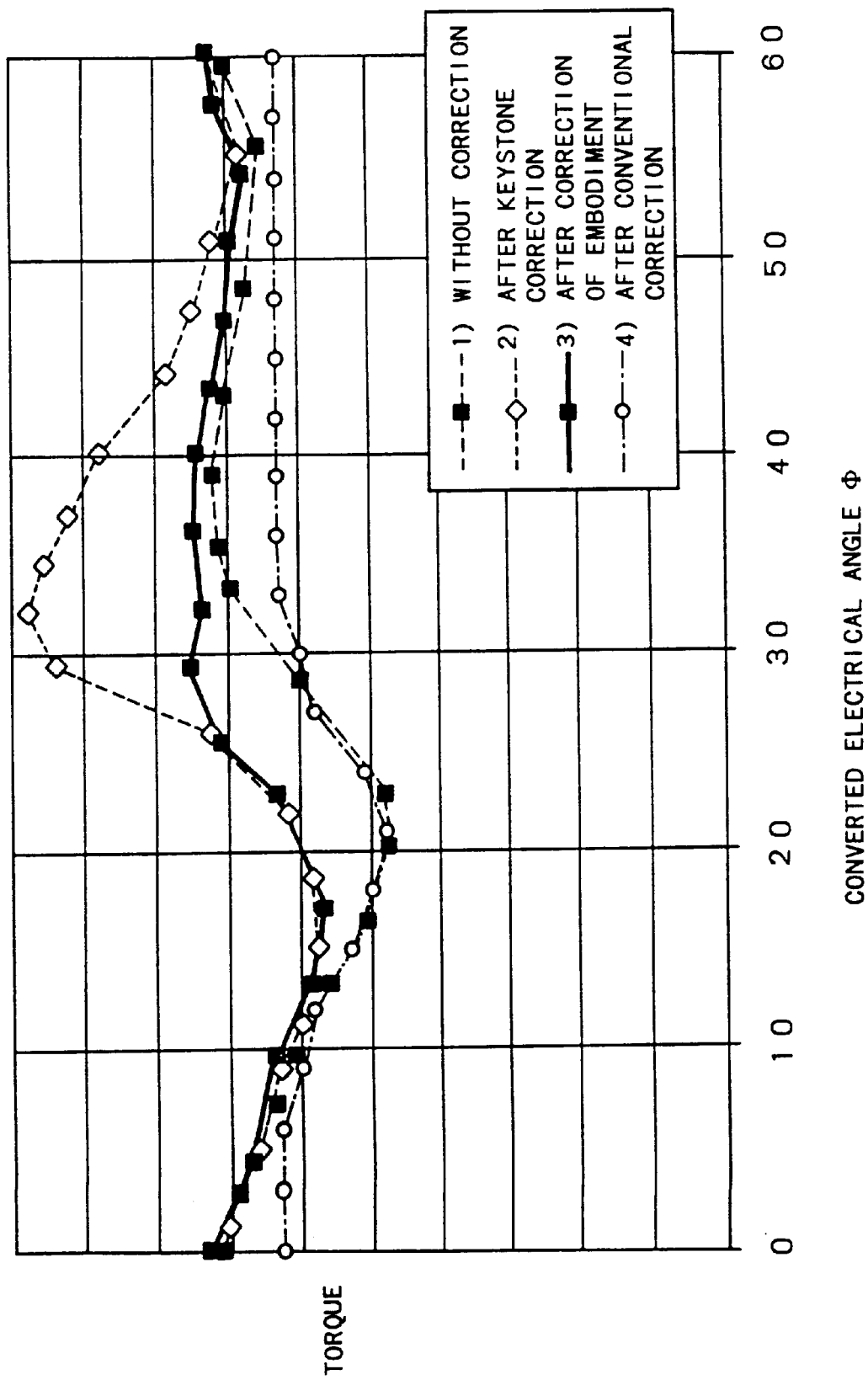
FIG. 9 is a graph showing waveforms of torque ripples of the synchronous motor 40 with or without the correction of the first embodiment.

The graph of FIG. 9 shows waveforms of torque ripples varying in a cycle of 60 degrees of electrical angle and observed on the synchronous motor 40 which is subject to the correction described above. The minimum torque, which is found at the electrical angle of 23 to 24 degrees in the sine-wave curve of phase current without correction (shown by the broken line with closed squares), is significantly raised in the curve of phase current after the correction by means of the synchronous motor control system 10 of the embodiment (shown by the solid line with closed squares). In the graph of FIG. 9, the broken line with open squares shows a waveform of torque ripples when the phase current is corrected to its peak value over the full range of 60 degrees of electrical angle. In the description hereinafter, this is referred to as keystone correction. When the target phase current for producing the primary magnetic flux of the revolving magnetic field is continuously kept at its peak value, the mean torque of the synchronous motor 40 is increased whereas the difference between the maximum torque and the minimum torque, that is, the torque ripple, becomes greater. The synchronous motor control system 10 of the embodiment specifies a period of a torque fall based on the electrical angle and corrects the target phase current to its peak value during the specified period.

When the target phase current for producing the primary magnetic flux of the revolving magnetic field is shifted, the synchronous motor control system 10 of the embodiment corrects the value of the target phase current to the peak value thereof. This structure can effectively prevent a fall of torque, which starts at the point of phase shift and reaches its minimum at the electrical angle of 23 to 24 degrees in the conventional system, thereby reducing torque ripples. This correction does not interfere with an increase in mean torque unlike the conventional correction curve shown by the one-dot chain line with open circles in the graph of FIG. 9, but reduces torque ripples while improving the mean torque of the synchronous motor 40. The structure of the synchronous motor control system 10 can realize the conflicting objects, that is, to increase the output torque per unit weight of the synchronous motor 40 and to reduce torque ripples. By way of example, the synchronous motor control system 10 of the embodiment reduced torque ripples by approximately 30% while increasing the mean torque by approximately 7%.

The synchronous motor control system 10 of the embodiment executes the electrical angle-depending correction in the d-q coordinate system, thereby simplifying the control programs and not requiring the correction for all the three phases. Although the electrical angle of the synchronous motor 40 is measured with the rotational angle sensor 19 in the embodiment, the electrical angle may be estimated from the phase currents Iu and Iv. Such modification further simplifies the whole structure.

A synchronous motor control system 10A for controlling a synchronous motor mounted on an electric vehicle is described as a second embodiment of the present invention. In electric vehicles, it is important to make a driver (and passengers) feel substantially no torque ripples of the synchronous motor for a good ride. The driver feels torque ripples of the synchronous motor working as the power source of electric vehicles especially when the synchronous motor rotates at a low speed to give a small force of inertia of loading. It is accordingly desired to minimize the torque ripples at least during the low-speed revolution of the synchronous motor. The synchronous motor control system 10A of the second embodiment changes the method of phase current control based on the revolving speed of the synchronous motor used as a parameter.

The synchronous motor control system 10A of the second embodiment has a similar structure to that of the synchronous motor control system 10 of the first embodiment, and executes a similar program to the electric current control program of FIG. 5, except the phase current correction process of step S130. The general structure of the synchronous motor control system 10A is thus omitted here. In the second embodiment, like numerals or symbols denote like elements, which are not described here.

Figure 10:
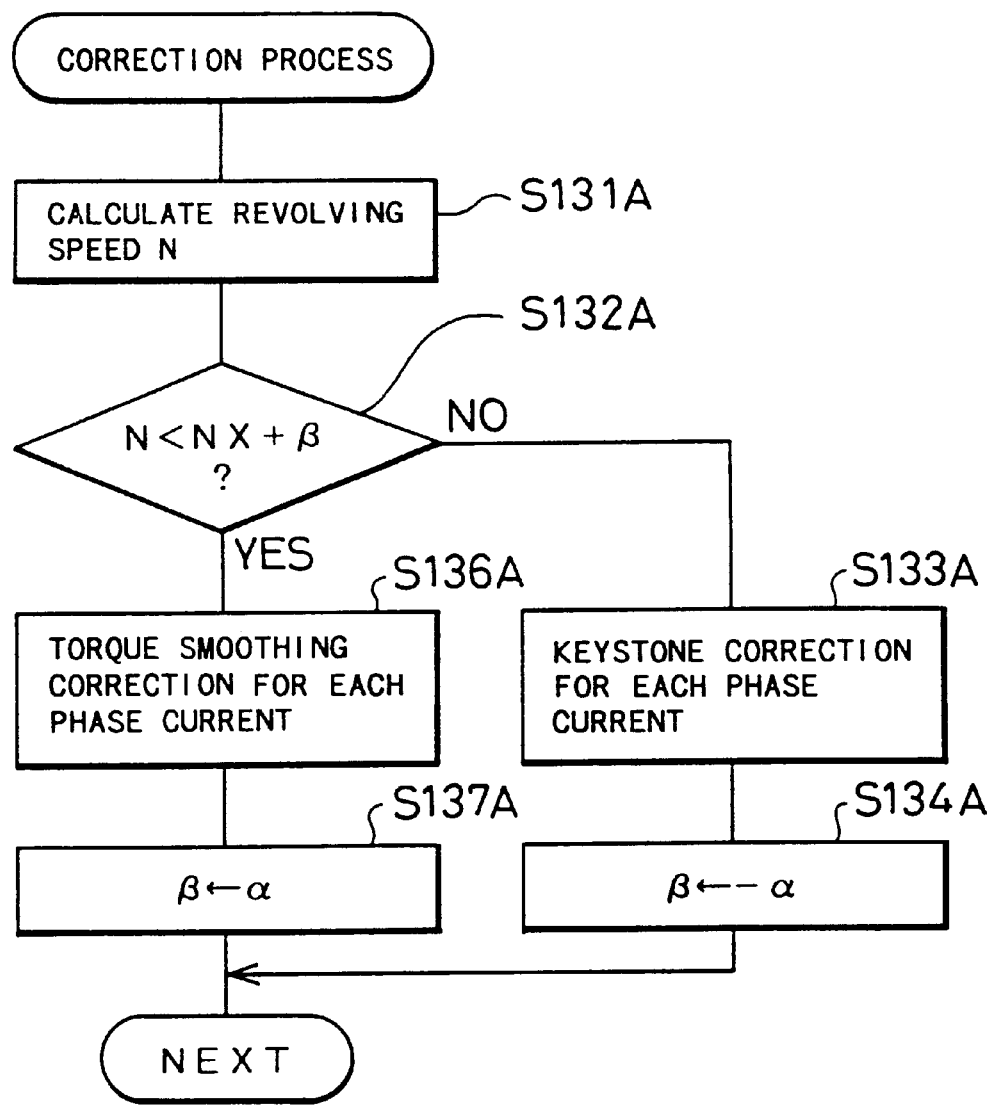
FIG. 10 is a flowchart showing details of a correction procedure executed at step S130 of FIG. 5 in a second embodiment according to the present invention.

The synchronous motor control system 10A of the second embodiment implements the phase current correction process of step S130 (FIG. 5) according to a correction procedure shown in the flowchart of FIG. 10. When the program enters the torque correction routine of FIG. 10, the CPU 202 first calculates a current revolving speed N of the synchronous motor 40 at step S131A. Any suitable known method, for example, differentiation of the electrical angle $\phi$ of the rotor 50 or operation from the vehicle speed and the gear ratio, may be applicable to the calculation of the revolving speed N. At step S132A, the current revolving speed N of the synchronous motor 40 is compared with a sum of a predetermined value NX and a variable $\beta$ (=NX+$\beta$). The predetermined value NX depends upon the characteristics of the vehicle on which the synchronous motor control system 10A is mounted, and represents a critical revolving speed over which the driver feels vibrations due to torque ripples. The value NX is appropriately determined with a vibration meter or according to the results of feeling test. The predetermined value NX was set equal to 600 [rpm] in this embodiment.

The variable $\beta$ gives a hysteresis to the decision of step S132A.

Figure 11:
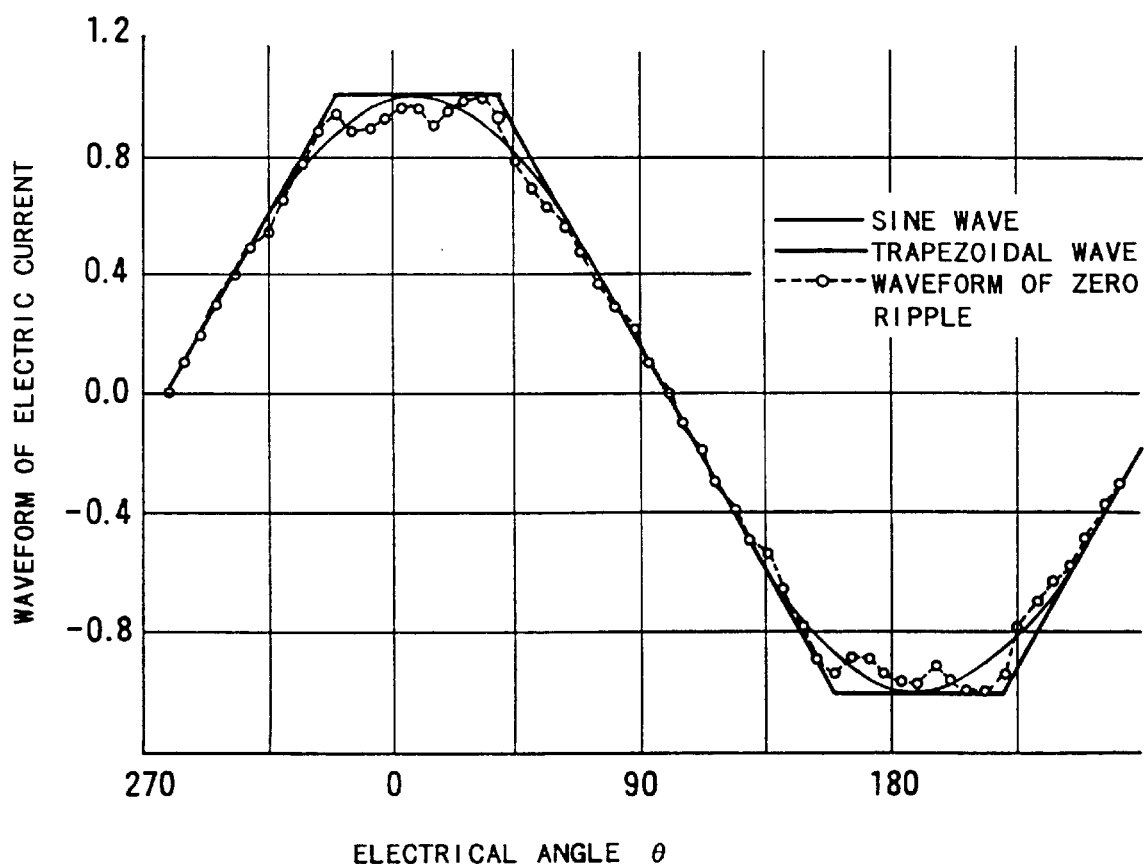
FIG. 11 is a graph showing a variation in phase current obtained by the correction of FIG. 10.
Figure 12:
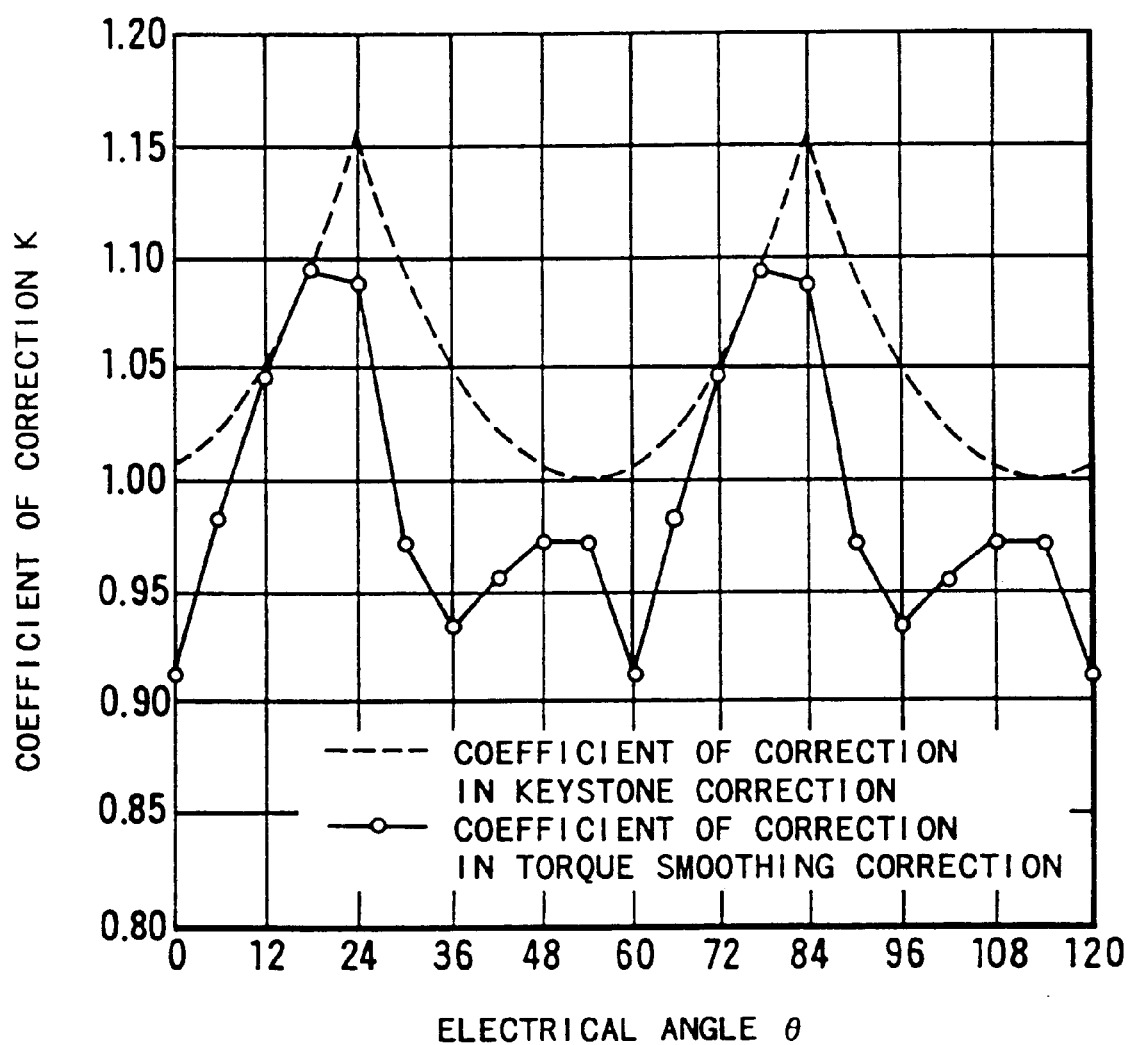
FIG. 12 shows variations in correction of coefficient used for the correction of FIG. 10.

When the current revolving speed N is determined to be equal to or greater than NX+$\beta$ at step S132A, the program goes to step S133A to execute keystone correction of the phase current and subsequently to step S134A to substitute the value -$\alpha$ into the variable $\beta$ for giving a hysteresis. The program then exits from the routine of FIG. 10. Under the condition of NX+$\beta$≦N, each phase current in the actual three-phase coordinate system is corrected to a trapezoidal waveform as shown by the solid line in the graph of FIG. 11. The keystone correction enables the target phase current for producing the primary magnetic flux of the revolving magnetic field to be continuously kept at the peak value in the whole period of 60 degrees of electrical angle. This maximizes the mean torque of the synchronous motor 40 as shown by the broken line with open squares in FIG. 9. In the range where the revolving speed N of the synchronous motor 40 is not less than NX+$\beta$ and the driver hardly feels the torque ripples, the keystone correction (step S133A) is selected to realize the maximum output torque per unit weight of the synchronous motor 40. FIG. 12 shows variations in coefficient of correction K plotted against the electrical angle $\theta$. The curve of broken line represents a variation in coefficient of correction K when the keystone correction is implemented. This graph shows variations in coefficient of correction K over the angle of 120 degrees, which corresponds to two cycles of ripples. The coefficient-of-correction curve gives an identical value at every 60 degrees. The coefficient of correction K is equal to the value '1' at the point of zero degree, where the target phase current reaches its peak value, and equal to the value 1/(cos30)=1.15 at the point of 30 degrees. No correction is carried out when the target phase current reaches its peak value. The maximum correction is, on the other hand, implemented when the absolute value of the target phase current drawing a sine-wave curve reaches its minimum in the range of one cycle of torque ripples.

When the current revolving speed N is determined to be less than NX+β at step S132A, that is, when it is determined that the synchronous motor 40 is rotated at a low speed and that the driver is accordingly tend to feel the torque ripples, on the contrary, the program executes torque smoothing correction at step S136A instead of the keystone correction of step S133A. At subsequent step S137A, the value +α a is substituted into the variable +α for giving a hysteresis. The torque smoothing correction executed at step S136A multiplies the target electric currents Id* and Iq* by the coefficient of correction K shown by the solid line with open circles in the graph of FIG. 12. As a result of torque smoothing correction, each phase current is controlled as shown by the solid line with open circles in the graph of FIG. 13.

Figure 13:
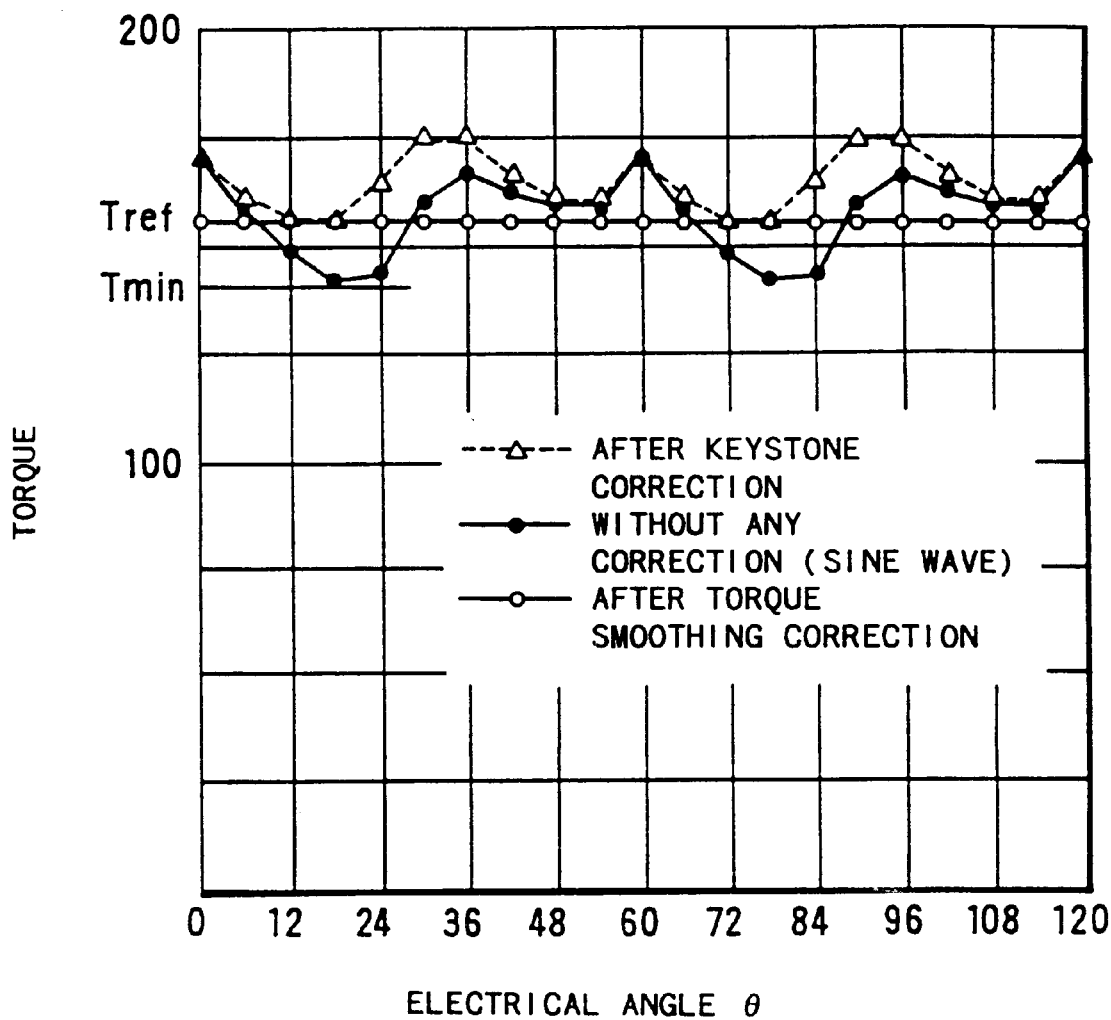
FIG. 13 is a graph showing waveforms of torque ripples of the synchronous motor 40 with or without the correction of the second embodiment.

The curve of coefficient of correction K (FIG. 12) used for the torque smoothing correction is determined in the following manner. In the graph of FIG. 13, the solid line with closed circles represents a fluctuation in torque of the synchronous motor 40 without any correction of phase current. Keystone correction significantly increases both the minimum torque and the maximum torque as shown by the broken line with open triangles. This means that the keystone correction increases torque ripples while improving the means torque. The value of electric current corresponding to the minimum torque obtained by the keystone correction is set as a reference value REF. The keystone-corrected electric current at each electrical angle is divided by the reference value REF, and the keystone-corrected electric current is then multiplied by the quotient of division. The division may be carried out with the value of torque instead of the value of electric current.

The purpose of these operations is to compensate for an over-rise of torque by the keystone correction. In accordance with a concrete procedure, the minimum torque in the keystone correction curve is set as a reference value, and the keystone-corrected electric current is decreased by the degree of over-ride at electrical angles producing greater torques than the minimum torque. Such procedure of torque smoothing correction enables the torque produced by the synchronous motor 40 to have a substantially constant minimum torque Tref of the solid line with open value, which coincides with a keystone correction as shown by circles in FIG. 13. This means that the torque ripples are controlled to be substantially equal to zero.

As discussed above, the synchronous motor control system 10A of the second embodiment can vary the output characteristics of the synchronous motor 40, which is used as the power source of electric vehicles, according to the revolving speed N of the synchronous motor 40. The system 10A determines the property primarily required for the synchronous motor 40, that is, reduction of torque ripples or improvement in the mean torque, based on the revolving speed N and varies the outputs of the synchronous motor 40 to fulfill the required property at the revolving speed N. The required property can be changed simply by varying the coefficient of correction corresponding to the electrical angle. Simple software is sufficient for that purpose. In accordance with a concrete procedure, a table including coefficients of correction is prepared in advance, and the correction of coefficient K corresponding to the revolving speed N is read from the specified address in the table.

The torque smoothing correction of step S136A executed at the low revolving speed of the synchronous motor 40 can produce the substantially constant torque Tref without any ripples as shown in FIG. 13. The substantially constant torque Tref is significantly greater than a minimum torque Tmin when the synchronous motor 40 is driven by three phase alternating currents of sine waves. Compared with the conventional method, which simply decreases the torque command value, the system 10A of the second embodiment can effectively control the phase currents to realize the improvement in the minimum torque, the improvement in the mean torque, and the reduction of torque ripples.

The above embodiments are only illustrative and not restrictive in any sense. There may be many modifications, alterations, and changes without departing from the scope or spirit of essential characteristics of the invention. By way of example, the three phase currents may directly be corrected without the 3 phase-to-2 phase transformation. The electrical angle, which is measured with the rotational angle sensor 19 in the above embodiments, may be estimated from the phase currents In and Iv. The power source used to make each corrected phase current actually flow through the synchronous motor 40 is not restricted to the inverter circuit of PAM (pulse width modulation) control.

In the second embodiment, the operation of phase current correction is selected among the two methods according to the revolving speed of the synchronous motor 40. In accordance with one application, the appropriate combination of keystone correction with torque smoothing correction may be used according to the revolving speed. A variety of driving conditions of the vehicle, for example, the speed, the acceleration, or the operating state of the accelerator or brake, other than the revolving speed may be used as the parameter for selecting the appropriate method of correction. Although the above embodiments aim at reducing torque ripples, the correction procedures of the invention may be applied to increase torque ripples.

The first and the second embodiments discussed above execute correction by keystone correction or torque smoothing correction. The method of correcting the phase current according to the electrical angle is arbitrarily selected with the keystone correction as an upper limit. As discussed above, the keystone correction raises the minimum torque of torque ripples observed at the electrical angles of 23 to 24 degrees. The coefficient of correction representing the keystone correction should be selected at least in this range of electrical angle. The coefficient of correction may arbitrarily be set at other electrical angles based on the other output characteristics required for the synchronous motor 40. In accordance with another application, each phase current may be corrected irrespective of torques or torque ripples. In this case, the respective phase currents can freely be controlled according to a variety of factors and the required characteristics are taken out of the synchronous motor.

The scope and spirit of the present invention are limited only by the terms of the appended claims.

What is claimed is:

1. A synchronous motor control system for supplying n-phase alternating currents to respective phase coils of a synchronous motor to activate and rotate said synchronous motor, wherein n is an integer greater than two and each current has a sine wave as a basic waveform, said synchronous motor control system comprising:

an electrical angle measurement device configured to measure an electrical angle of each phase current of said n-phase alternating currents;

phase current modification device configured to execute a modification of a predetermined phase current over a range of ±180/2·n degrees from a specified electrical angle, at which said predetermined phase current having a sine-wave curve reaches a peak value, based on said electrical angle measured by said electrical angle measurement device, said peak value of said sine-wave curve being a limit of said modification; and a balancing mechanism configured to change phase currents other than said predetermined phase current which is subject to said modification by said phase current modification device, thereby balancing a sum of all said phase currents.

2. A synchronous motor control system in accordance with claim 1, said system further comprising:

a driving parameter monitor configured to measure a driving parameter of said synchronous motor; and wherein said phase current modification device is configured to be activated only when said driving parameter of said synchronous motor measured by said driving parameter monitor satisfies a predetermined condition.

3. A synchronous motor control system in accordance with claim 2, wherein;

said driving parameter monitor is configured to measure a revolving speed of said synchronous motor; and said phase current modification device is configured to be activated when said revolving speed is less than a predetermined level.

4. A synchronous motor control system in accordance with claim 1, wherein said n-phase alternating currents supplied to said respective phase coils of said synchronous motor are three phase alternating currents.

5. A synchronous motor control system in accordance with any one of claims 1 through 4, wherein said synchronous motor control system is configured to activate and control a synchronous motor mounted on a vehicle as a power source.

6. A method of controlling a synchronous motor by supplying n-phase alternating currents to respective phase coils of said synchronous motor to activate and rotate said synchronous motor, wherein n is an integer greater than two and each current has a sine wave as a basic waveform, said method comprising the steps of:

(a) measuring an electrical angle of each phase current of said n-phase alternating currents;

(b) executing a modification of a predetermined phase current over a range of ±180/2·n degrees from a specified electrical angle, at which said predetermined phase current having a sine-wave curve reaches a peak value of said sine-wave curve, based on said electrical angle measured in said step (a), said peak value of said sine-wave curve being set as a limit of said modification; and (c) changing phase currents other than said predetermined phase current which is subject to said modification of said step (b), thereby balancing a sum of all said phase currents.

7. A method in accordance with claim 6, said method further comprising the step of:

(d) measuring a driving parameter of said synchronous motor, said step (b) being carried out only when said driving parameter of said synchronous motor measured in said step (d) satisfies a predetermined condition.

8. A method in accordance with claim 7, wherein:

said step (d) comprises measuring a revolving speed of said synchronous motor; and said step (b) comprises executing said modification when said revolving speed is less than the predetermined level.

9. A method in accordance with claim 6, comprising:

supplying three-phase alternating currents to respective phase coils of said synchronous motor.

10. A synchronous motor control system for controlling a synchronous motor, wherein multi-phase alternating currents flow through field coils of said synchronous motor and an internal rotor of said synchronous motor is driven to rotate by an interaction of a magnetic field produced by said multi-phase alternating currents with a magnetic field produced by permanent magnets mounted on said rotor said synchronous motor control system comprising:

a current modification device configured to modify a specified phase current of said multiphase alternating currents close to a peak value of said alternating currents over a predetermined range around a specific electrical angle at which a momentary value of said specified phase current reaches a peak value; and a balancing mechanism configured to balance a sum of said multi-phase alternating currents by changing phase currents other than said specified phase current modified by said current modification device.

11. A synchronous motor control system in accordance with claim 10, wherein said predetermined range around said specific electrical angle, in which said current modification device modifies said specified phase current, is a range of ±180/2n degrees from a specific electrical angle, at which said specified phase current reaches a peak value of a sine-wave curve, wherein n denotes a number of phases of alternating currents.

12. A synchronous motor control system in accordance with claim 10, wherein said multi-phase alternating currents flowing through said field coils of said synchronous motor comprise three phase alternating currents.

13. A synchronous motor control system in accordance with claim 10, wherein said specified phase current modified by said current modification device and flowing through one of said field coils of said synchronous motor has a trapezoidal waveform.

14. A synchronous motor control system in accordance with claim 10, wherein said synchronous motor control system is configured to control a synchronous motor mounted on a vehicle as a power source.

15. A synchronous motor control system in accordance with claim 11, wherein said synchronous motor control system is configured to control a synchronous motor mounted on a vehicle as a power source.

16. A method of controlling a synchronous motor, wherein multi-phase alternating currents flow through field coils of said synchronous motor and an internal rotor of said synchronous motor is driven to rotate by an interaction of a magnetic field produced by said multi-phase alternating currents with a magnetic field produced by permanent magnets mounted on said rotor, said method comprising the steps of:

(a) modifying on a specified phase current of said multi-phase alternating currents to a peak value of said alternating currents over a predetermined range around a specific electrical angle at which a momentary value of said specified phase current reaches a peak value; and (b) changing phase currents other than said specified phase current modified in said step (a), thereby balancing a sum of said multi-phase alternating currents.

17. A method in accordance with claim 16, wherein modifying a specified phase current is performed over a range of ±180/2n degrees from a specific electrical angle, at which said specified angle phase current having a sine-wave curve reaches a peak value thereof, wherein n denotes a number of phases of alternating currents.

18. A method in accordance with claim 16, wherein modifying a specified phase current is performed by modifying a specified phase current of three phase alternating currents.

19. A method in accordance with claim 16, further comprising a step of:

controlling said specified phase current modified in said step (a) to have a trapezoidal waveform.

* * * * *